Inventor:
Roy A. Driscoll.
By James M. Abbett
Attorney.

July 18, 1950  R. A. DRISCOLL  2,515,764
APPARATUS FOR CONVERTING METALS
Filed Jan. 10, 1948  2 Sheets-Sheet 2

Inventor:
Roy A. Driscoll.
By James M. Abbett
Attorney.

Patented July 18, 1950

2,515,764

UNITED STATES PATENT OFFICE 2,515,764

APPARATUS FOR CONVERTING METALS

Roy A. Driscoll, Fontana, Calif.

Application January 10, 1948, Serial No. 1,582

1 Claim. (Cl. 13—2)

This invention relates to the art of metallurgy, and particularly pertains to a method of and apparatus for converting metals.

In treating iron ores to produce steel it is common practice to carry out smelting methods which involve the use of coke. In some localities coke is difficult to obtain and it is desirable to provide some means of supplying the necessary carbonaceous material for the process without being dependent on a coke supply. It is also common practice to first produce pig iron and to thereafter convert the pig iron into steel. It is the principal object of the present invention, therefore, to provide a method of and apparatus for treating iron ore so that it can be reduced by the use of available low grade carbonaceous material acting upon various grades of ore, even including magnetite ores which cannot be treated successfully in a blast furnace, and at the same time to provide a direct method of reducing steel without the necessity of the intermediate step of reducing the ore to pig iron, and which method shall produce desirable by-products including a combustible gas suitable for heating purposes.

The invention contemplates the provision of an electric furnace having a stack through which fumes are drawn from the furnace and within which stack ore is fed to the furnace, the furnace being also provided with means for feeding controlled quantities of carbonaceous material and a reducing agent into the furnace as required.

The invention is illustrated by way of example in the accompanying drawing in which.

Figure 1:
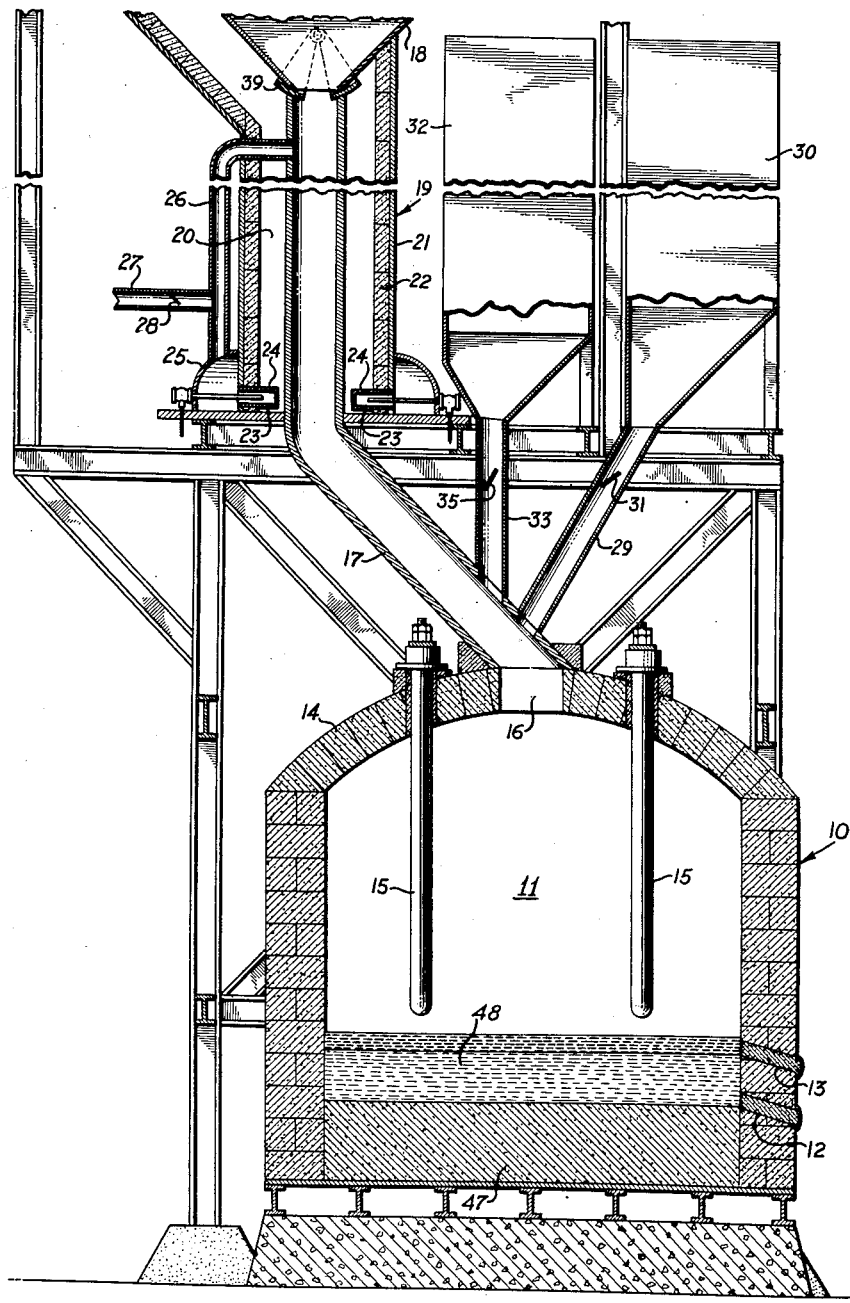
Figure 1 is a view in vertical section showing one form of a furnace embodying the principles of the present invention.

Referring more particularly to the drawings, 10 indicates a furnace lined with refractory material and thus providing a chamber 11. Above the floor of the furnace is a tap hole 12 which may be temporarily plugged to cause the molten metal to be retained within the furnace. At a point in the wall above the hole 12 is a slag hole 13 through which slag may be drained off from above the matte. Suitably supported through the roof 14 of the furnace are electrodes 15 which are connected to electric power feed conduits. Formed through the roof is an opening 16 which receives an ore admission and gas discharge stack 17. This stack extends upwardly and communicates with a hopper 18. Circumscribing the stack 17 is a pipe 19. The pipe 19 is of materially greater diameter than the stack 17 and provides an annular combustion chamber 20. The stack 17 is preferably made of heat-resisting cast iron tubing. The pipe 19 has an outer tubular metal wall 21 and an inner refractory liner 22. The lower end of the pipe 19 is closed around the stack 17. Extending through the walls of the pipe 19 are gaseous fuel supply pipes 23 which carry burners 24 by which the air within the lower end of the flue chamber 20 may be heated. The fuel supply pipes 23 are connected with a manifold pipe 25 which in turn is attached to a fuel supply pipe 26. The combustible material from the burners 24 passes upwardly through the flue 20 and serves to heat the stack 17. The upper end of this pipe is in communication with the stack 17 through which combustible gases may flow, and thus will receive combustible gases from the stack which may be used in the burners 24. A gas draw-off pipe 27 is connected with the pipe 26 and is controlled by a valve 28. The draw-off pipe 27 may be led to a gas washing unit so that the gas may be used for various commercial purposes. Communicating with the portion of the stack 17 which extends below the pipe 19 is a pipe 29. This pipe is attached to the bottom of a supply bin 30 within which limestone or other similar agent is placed. The flow of material from the bin 30 is controlled by a valve 31. The stack 17 also communicates with a hopper 32 through a pipe 33. The hopper 32 receives carbonaceous material, such as powdered coal or the like, and its flow is controlled by a valve 35.

Figure 2:
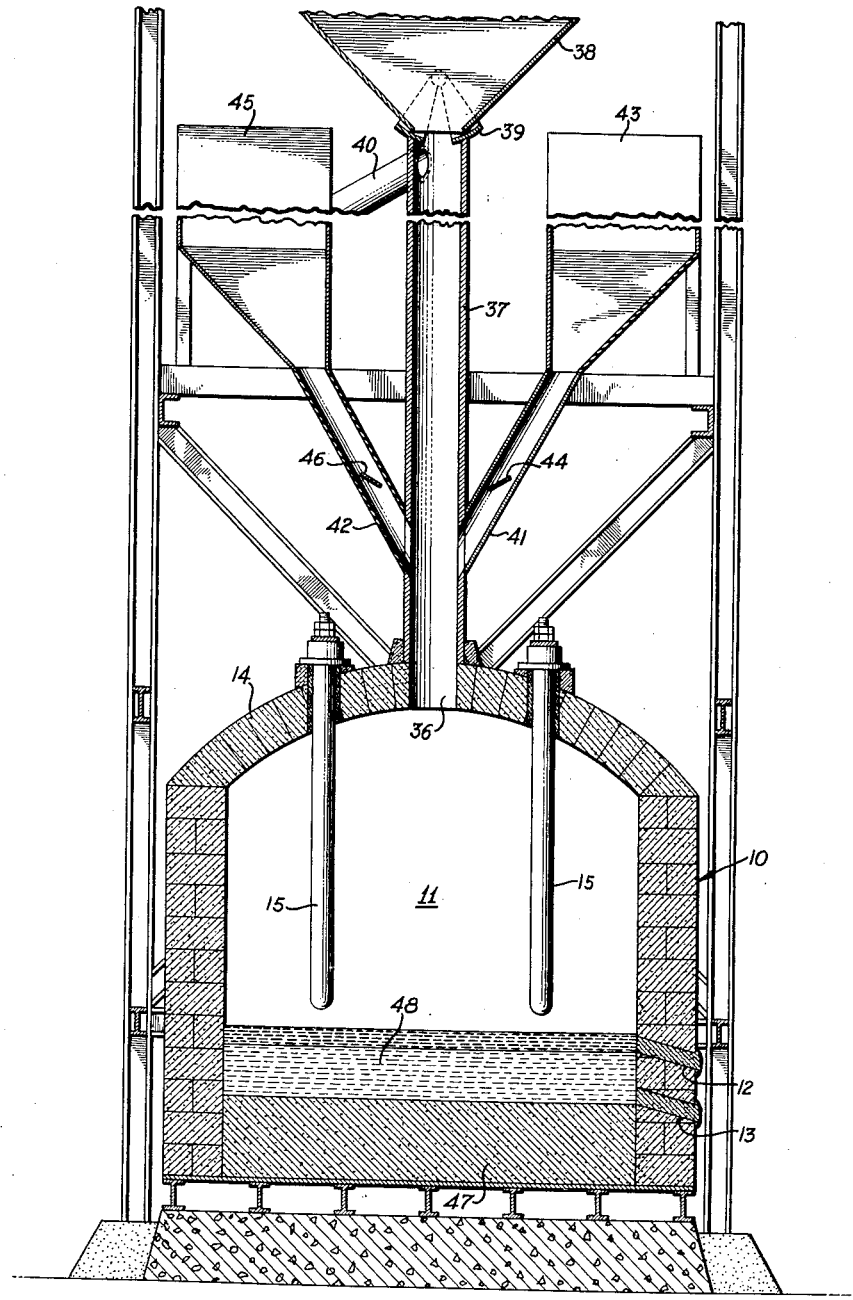
Fig. 2 is a view in vertical section showing a modification of the furnace structure.

In the form of the invention shown in Fig. 2 of the drawing a central stack 37 has been substituted for stack 17 as shown in Fig. 1. It is to be understood that in the use of stack 17 or 37 these members provide a downward passageway for ore and an upper passageway for gases from the furnace. The furnace 10 is provided with its roof 14 and is formed with an opening 36 to receive the lower end of a stack 37. The upper end of stack 37 receives an ore hopper 38. The ore hopper is provided with a valve 39 which controls the down-flow of ore from the hopper through the stack 37 and into the furnace 10. A gas draw-off pipe 40 communicates with the stack 37 at its upper end and may convey gas to a suitable gas washer and holder.

Extending through the side walls of the stack 37 at a level above the roof of the furnace 14 are tubes 41 and 42. The tube 41 communicates with a hopper 43 within which lime or other similar agent is placed. A valve 44 controls the flow of the material from the hopper. The tube 42 communicates with a hopper 45 within which powdered coal or other carbonaceous material is placed. The flow of this material is controlled by a valve 46.

In operation of the present invention the furnace is built as shown in the drawing. A suitable bed of refractory material 47 is placed in the bottom of the furnace and upon which the metal matte may accumulate, as indicated at 48. The tap hole 12 is plugged and a suitable supply of electricity is delivered through the electrodes 15. A controlled supply of ore is then fed to the furnace by regulating the control valve 39 which occurs at the bottom of either the hopper 18 or the hopper 38. This valve is regulated so that the ore will fall while in a condition of dispersion. This makes it possible for it to be heated and to be intimately commingled with the gases which are passing from the furnace. At the same time finely divided carbonaceous material is delivered from the bin 32 in Fig. 1 or the bin 43 as shown in Fig. 2. This carbonaceous material may be any available material such as low grade bituminous coal, lignite, or even wood waste. The provision of a furnace and a method of operation which makes these materials available is of considerable importance since practically all of the steel smelters throughout the world have been planned so that their major operation is located near a body of high grade coking coal. By the use of the present furnace it is possible to carry on operations wherever any suitable carbonaceous material is obtainable and thus the location of the furnace is not limited to any part of the country. At the same time that the carbonaceous material is being fed into the ore stream as regulated by the valve on the carbonaceous material hopper, lime or other such reducing agent is also fed into the stream of ore and carbonaceous material. These three finely divided materials are then fed into the furnace chamber 11 where they are heated by the electric current passing from one of the electrodes 15 to the other. The iron ore in combination with the carbonaceous material and lime will thus be reduced directly to steel having a suitable carbon content and without requiring an intermediate step of making pig iron which is subsequently converted into steel by a separate process. It has been found in fact that the steel product made from the present method will be of a very high grade since the metal is not subjected to the great volume of oxygen and nitrogen which is present during the practice of old methods. It has also been found that the capacity of a furnace of the type here shown can successively handle large volumes of magnetite iron ores carrying titanium and other metal values.

It will thus be seen that the invention here disclosed provides a simple type of furnace by which iron ore may be converted to steel in a continuous operation and in which a high grade steel may be obtained without the necessity of including the step of making pig iron and with the advantage that the operation can be carried on in any locality where suitable carbonaceous material is obtainable without being limited to the use of high grade coking coal.

While I have shown the preferred apparatus for carrying out my invention and the preferred steps of procedure in practicing the same, it is to be understood that changes in the combination, construction and parts of the apparatus, as well as the steps of the method, may be made by those skilled in the art without departing from the spirit of the invention as claimed.

Having thus described my invention, what I claim and desire to secure by Letters Patent is:

A metallurgical furnace of the character described comprising; a stationary furnace having a fixed heating chamber, heating electrodes extending into said chamber, an open stack for the simultaneous admission of materials to said chamber and the discharge of gases from said chamber, a hopper at the outer end of said stack for controllably delivering material to said stack for passage therethrough to said chamber in counter directional flow and in heat exchange with gases from said chamber, a gas outlet from said stack adjacent said hopper, a plurality of material feeding means for discharging materials to said stack intermediate said outlet and said chamber, a stack heater surrounding said stack between said hopper and said plurality of material feeding means, and a gas burner in said heater together with means for supplying gas from said stack to said burner.

ROY A. DRISCOLL.

REFERENCES CITED

The following references are of record in the file of this patent:

UNITED STATES PATENTS

| Number | Name | Date |
| --- | --- | --- |
| 557,057 | Dickerson | Mar. 24, 1896 |
| 611,142 | Pignotti et al. | Sept. 20, 1898 |
| 704,993 | Weber | July 15, 1902 |
| 722,411 | Shade | Mar. 10, 1903 |
| 950,595 | Haultain | Mar. 1, 1910 |
| 1,196,202 | Berglund | Aug. 29, 1916 |
| 1,208,817 | Moffat | Dec. 19, 1916 |
| 1,421,185 | Driscoll | June 27, 1922 |
| 1,443,439 | Southgate | Jan. 30, 1923 |
| 1,496,232 | Klugh | June 3, 1924 |
| 1,585,344 | Greenawalt | May 18, 1926 |
| 1,967,274 | Weaton | July 24, 1934 |
| 1,987,952 | Wilson | Jan. 15, 1935 |
| 2,066,665 | Baily | Jan. 5, 1937 |
| 2,108,043 | Crist | Feb. 15, 1938 |
| 2,247,334 | Keemle | June 24, 1941 |
| 2,368,508 | Wile | Jan. 30, 1945 |